(12) United States Patent
Zhou et al.

(10) Patent No.: US 11,249,962 B2
(45) Date of Patent: Feb. 15, 2022

(54) COLUMN LOADABLE AND PAGE LOADABLE LOAD UNIT RECOMMENDATION SYSTEM

(71) Applicant: SAP SE, Walldorf (DE)

(72) Inventors: Panfeng Zhou, Dublin, CA (US); Xu-Dong Qian, Shanghai (CN); Yanhong Wang, Dublin, CA (US); Shyam Sunder Reddy Avula, San Ramon, CA (US); Amarnadh Sai Eluri, Pleasanton, CA (US); Chirag Samtani, Irvine, CA (US)

(73) Assignee: SAP SE, Walldorf (DE)

( * ) Notice: Subject to any disclaimer, the term of this patent is extended or adjusted under 35 U.S.C. 154(b) by 220 days.

(21) Appl. No.: 16/411,869

(22) Filed: May 14, 2019

(65) Prior Publication Data
US 2020/0364193 A1    Nov. 19, 2020

(51) Int. Cl.
*G06F 16/21* (2019.01)
*G06F 16/185* (2019.01)
*G06F 11/34* (2006.01)
*G06F 16/242* (2019.01)

(52) U.S. Cl.
CPC ........ *G06F 16/213* (2019.01); *G06F 11/3414* (2013.01); *G06F 16/185* (2019.01); *G06F 16/2423* (2019.01)

(58) Field of Classification Search
CPC .............. G06F 16/213; G06F 16/2423; G06F 11/3414; G16F 16/185
USPC ......................................................... 707/803
See application file for complete search history.

(56) References Cited

U.S. PATENT DOCUMENTS

| | | | |
|---|---|---|---|
| 10,650,017 B1 * | 5/2020 | Gupta | G06F 16/2282 |
| 2009/0210445 A1 * | 8/2009 | Draese | G06F 16/221 |
| 2012/0221577 A1 * | 8/2012 | Fuh | G06F 16/22 707/741 |
| 2013/0232379 A1 * | 9/2013 | Aronovich | G06F 11/2094 714/20 |
| 2017/0235590 A1 * | 8/2017 | Sinha | G06F 11/2046 718/1 |
| 2020/0036787 A1 * | 1/2020 | Gupta | H04L 67/1097 |

* cited by examiner

*Primary Examiner* — Alicia M Antoine
(74) *Attorney, Agent, or Firm* — Sterne, Kessler, Goldstein & Fox P.L.L.C.

(57) ABSTRACT

Disclosed herein are systems, methods, and devices for providing load unit recommendations. An example method includes monitoring queries executed by a database management system including a database object, determining an access frequency of the database object based upon the monitoring, and determining relative access counter information for the database object based on the access frequency. Subsequently, the method includes generating a sorted element based on the relative access counter information, determining threshold values based on threshold information and the sorted element, and determining a load unit for the database object based on the sorted element and the threshold values. The load unit indicates whether to load the whole database object, or only a portion thereof, into a main memory of the DBMS while accessing the database object.

18 Claims, 5 Drawing Sheets

COLUMN LOADABLE AND PAGE LOADABLE LOAD UNIT RECOMMENDATION SYSTEM

BACKGROUND

Some database management systems (DBMS), e.g., in-memory database systems, offer different load unit formats (e.g., column loadable, page loadable, etc.) for a database object (i.e., table/partition/column). A column loadable (i.e. CL) load unit format may require loading the whole data object into main memory when accessing it. Storing a database object in CL format offers faster and more predictable access performance. However, as the memory footprint of a DBMS increases in size with the addition of new database objects, it becomes unfeasible to load all of the database objects of the DBMS into memory. A page loadable (i.e., PL) load unit format may require loading a portion (e.g., a single page) of the data object into main memory when accessing it. Storing a database object in PL format offers slower access performance, but may significantly reduce the memory footprint of the database object. Often database administrators are unable to identify a suitable load unit format for individual database objects that can achieve an optimal balance between access performance and memory footprint for a DBMS.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for implementing a load unit recommendation system.

Figure 1:
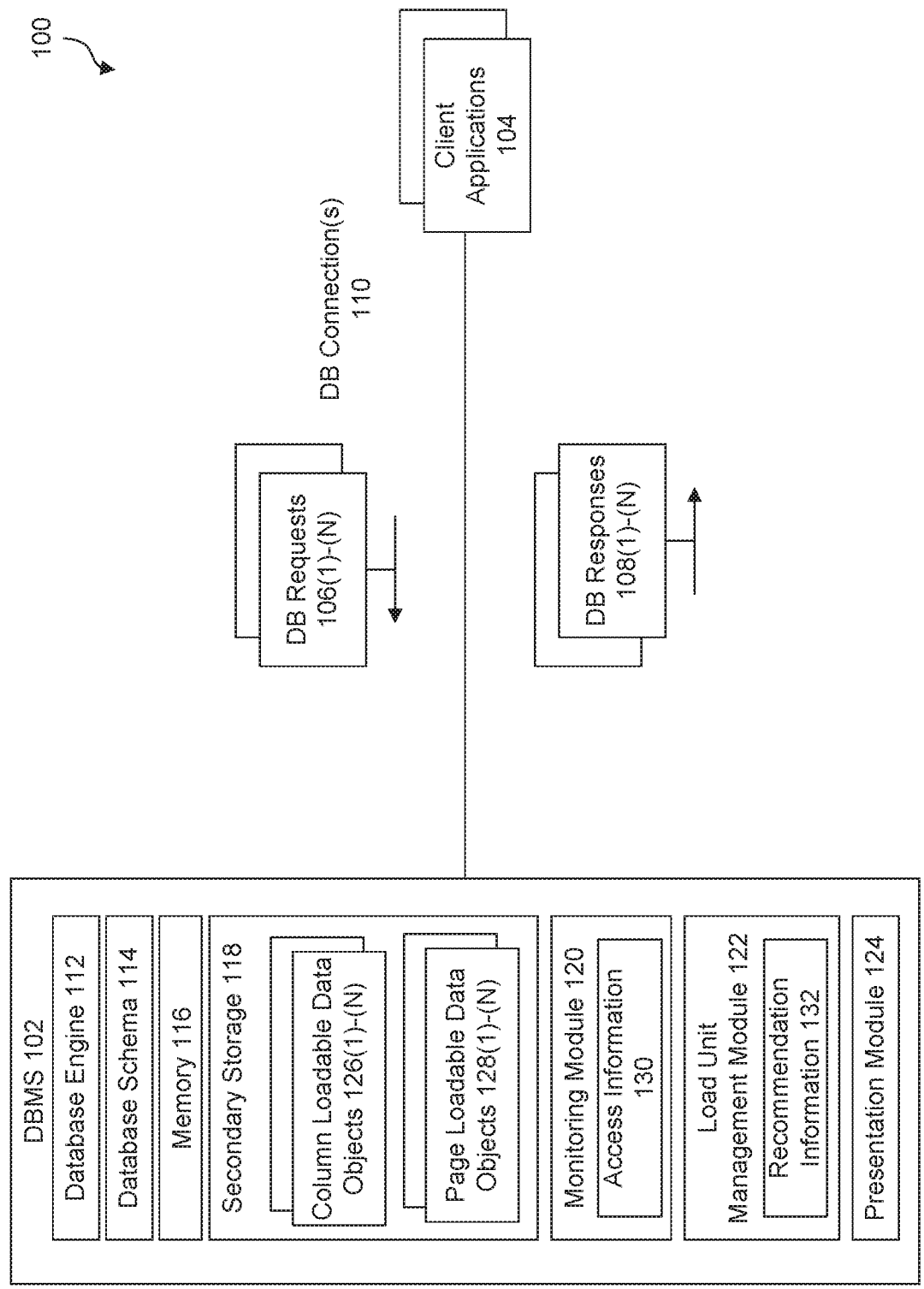
FIG. 1 is a block diagram of an example framework for implementing a load unit recommendation system, according to some embodiments.

FIG. 1 illustrates a block diagram of an example framework for implementing a load unit recommendation system 100, according to some embodiments. As illustrated in FIG. 1, the load unit recommendation system 100 includes a DBMS 102, and a plurality of client applications 104(1)-(N) configured to send database requests 106(1)-(N) to the DBMS 102 and receive database responses 108(1)-(N) from the DBMS 102 via one or more database connections 110. In some examples, the database requests 106(1)-(N) may include database queries, and the database responses 108(1)-(N) may include query responses.

As referred to herein, in some embodiments, a "database management system" may include a software system that handles the storage, retrieval, and updating of data in a database. As used herein, and in some embodiments, a "database" refers to an organized collection of data. In some embodiments, a database may include a plurality of data tables comprising data values (e.g., alphanumeric strings, integers, decimals, floating points, dates, times, binary values, Boolean values, and/or enumerations).

Some examples of databases include columnar databases, relational databases, key-store databases, graph databases, and document stores. In some embodiments, the DBMS 102 may include column-based storage capabilities wherein the contents of a column of a database are placed next to each other within a storage component, or row-based storage capabilities wherein the contents of a row of a database are placed next to each other within a storage component. Further, the DBMS 102 may include in-memory database capabilities that permit the DBMS to store database objects in a section of relatively faster memory (e.g., main memory) as opposed to a slower mass storage device (e.g., secondary storage).

As illustrated in FIG. 1, the DBMS 102 may include a database engine 112, a database schema 114, main memory 116, secondary storage 118, a monitoring module 120, a load unit management module 122, and a presentation module 124. Further, the DBMS 102 may include database objects (e.g., column loadable database objects 126(1)-(N) and page loadable database objects 128(1)-(N)). As referred to herein, in some embodiments, a "database object" may include any object in a database that is used to store or reference data. Some examples of a database object in a columnar database, or a database having column-based storage capabilities, include database tables, database partitions, and database columns.

In some embodiments, the DBMS 102 may include a plurality of database tables including the database objects. For example, a first database table of the DBMS 102 may include a first plurality of the database objects, and a second database table of the DBMS 102 may include a second plurality of the database objects. In addition, the first database table may be split into multiple database partitions. As such, a first subset of the first plurality of database objects may be assigned to a first database partition of the first database table, and a second subset of the first plurality of database objects may be assigned to a second database partition of the first database table.

In some embodiments, the database schema 114 may define the structure and/or organization of the DBMS 102. For instance, the database schema 114 may define the relationships between the database tables, the database partitions, and the database columns. Further, the database schema 114 may define the load unit of individual database objects. In other words, the database schema 114 may identify which database objects are column loadable database objects 126(1)-(N), and which database objects are the page loadable database objects 128(1)-(N). As described in detail herein, in some embodiments, the contents of a "column loadable" database object are loaded into the main memory 116 when accessed, whereas only a portion of a "page loadable" database object is loaded into the main memory 116 when accessed.

The database engine 112 may be configured to execute database commands within the DBMS 102. For instance, the database engine 112 may be configured to create, retrieve, update, and delete database objects within the DBMS 102. As such, the database engine 112 may be employed to administer and manage the database schema 114, Further, the database engine 112 may be configured to manage database transactions, database indexes, backup operations, workload replay, shadowing, etc.

The monitoring module 120 may monitor database commands executed by the database engine 112, and determine access information 130 for the column loadable database objects 126(1)-(N) and the page loadable database objects 128(1)-(N). For instance, the monitoring module 120 may determine that the database request 106(1) is a database query corresponding to the column loadable database object 126(1). In response, the monitoring module 120 may update a running count of the instances in which a database command has caused the database engine 112 to access the column loadable database object 126(1).

As described in detail herein, the load unit management module 122 may determine recommendation information 132 identifying recommended load units for the database objects based upon the access information 130. In particular, the load unit management module 122 may evaluate the access information 130 collected by the monitoring module 120, and identify the database objects that when loaded into the main memory 116 as column loadable database objects 126 achieve satisfactory memory savings while minimizing negative performance outcomes.

Once the load unit management module 122 determines the recommendation information 132, the DBMS 102 may present the recommendation information 132 to a user via the presentation module 124. In response, the user may execute one or more database commands over the database engine 112 to update the database schema 114 to reflect the recommendation information 132. For example, the user may send a database request 106(1), to the DBMS 102, instructing the database engine 112 to update the database schema 114 so that the database objects identified in the recommendation information 132 as having column loadable as the recommend load unit are processed as column loadable database objects 126(1)-(N) by the DBMS 102. Additionally, or alternatively, the DBMS 102 may automatically update the database schema 114 based upon the recommendation information 132.

Figure 2:
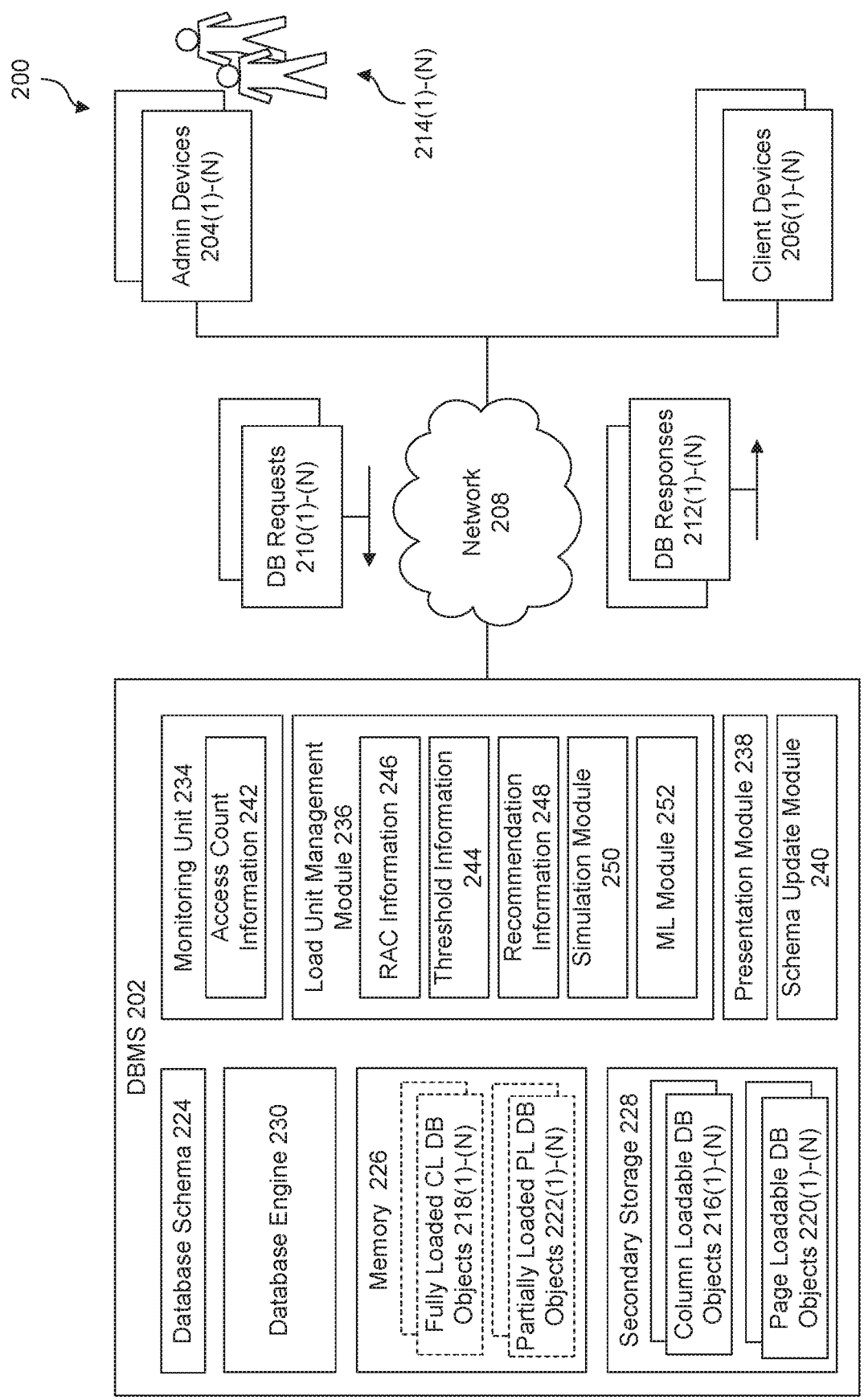
FIG. 2 is a block diagram of an example framework for implementing a load unit recommendation system, according to some embodiments.

FIG. 2 illustrates a block diagram of an example framework for implementing a load unit recommendation system 200, according to some embodiments. As illustrated in FIG. 2, the load unit recommendation system 200 includes a DBMS 202 (e.g., DBMS 102), a plurality of administrator devices 204(1)-(N), a plurality of client devices 206, and one or more communication networks 208. Some examples of an administrator device 204 or a client device 206 include desktops, laptops, and netbooks; tablet computing devices; smart phones, mobile communication devices, and any other computing device capable of sending communications to the DBMS 202 or receiving communications from the DBMS 202.

In some embodiments, the DBMS 202, the administrator devices 204, and the client devices 206 exchange data (e.g., database requests 210(1)-(N) and database responses 212(1)-(N)) via the communication network(s) 208. The communication network(s) 208 may include any or all of a private network, personal area network (PAN), Local-Area Network (LAN), Wide-Area Network (WAN), or the Internet. Further, the connection between any of the DBMS 202, the administrator devices 204(1)-(N), or the client devices 206(1)-(N), and the communication network(s) 208 may be a wireless connection (e.g., Bluetooth, Wi-Fi connection, etc.), or a wired connection (e.g., Ethernet, universal serial bus (USB), etc.).

The administrator devices 204(1)-(N) may be associated with a plurality of administrators 214(1)-(N). For instance, a first administrator 214(1) may be associated with a first administrator device 204(1), a second administrator 214(2) may be associated with a second administrator device 204(1), an Nth administrator 214(N) may be associated with an Nth administrator device 204(N), and so forth. Further, the administrators 214(1)-(N) may manage the DBMS 202 via the administrator devices 204(1)-(N).

In some embodiments, the administrator devices 204(1)-(N) may be employed by the administrators 214(1)-(N) to send database requests 210(1)-(N), including database commands and/or database settings, to the DBMS 202. In response, the DBMS 202 may send database responses 212(1)-(N), confirming or denying execution of the database commands or updating of the database configuration, to the administrator devices 204(1)-(N).

Further, in some embodiments, the administrator devices 204(1)-(N) may be employed by the administrators 214(1)-(N) to send database requests 210(1)-(N), including database queries, to the DBMS 202. In response, the DBMS 202 may send database responses 212(1)-(N), including database query results, to the administrator devices 204(1)-(N). Further, the database query results may pertain to database objects (e.g., column loadable database objects 216(1)-(N) which may be fully loaded during access by the DBMS 202 as the fully loaded column loadable database objects 218, or page loadable database objects 220(1)-(N) which may be partially loaded during access by the DBMS 202 as the partially loaded page loadable database objects 222) stored on the DBMS 202, representations of the database objects stored on the DBMS 202, or the results of functions performed on the database objects of the DBMS 202.

In some embodiments, the client devices 206(1)-(N) may be configured to send database requests 210(1)-(N), including database queries, to the DBMS 202. In response, the DBMS 202 may send database responses 212(1)-(N), including database query results, to the client devices 206(1)-(N). Further, the database query results may pertain to database objects (e.g., column loadable database objects 216(1)-(N) which may be fully loaded during access by the DBMS 202 as the fully loaded column loadable database objects 218(1)-(N), or page loadable database objects 220(1)-(N) which may be partially loaded during access by the DBMS 202 as the partially loaded page loadable database objects 222) stored on the DBMS 202, representations of the database objects stored on the DBMS 202, or the results of functions performed on the database objects of the DBMS 202.

In some embodiments, the DBMS 202 may be organized in accordance with a database schema 224. In some embodiments, the database schema 224 may define the tables, fields, indexes, relationships, views, packages, functions, queues, triggers, types, sequences, or procedures of the DBMS 202. For example, the database schema 224 may define the column loadable database objects 216(1)-(N) (i.e., the database objects having a "column loadable" load unit), and the page loadable database objects 220(1)-(N) (i.e., the database objects having a "page loadable" load unit).

As illustrated in FIG. 2, DBMS 202 includes a database engine 230 (e.g., the database engine 112), a monitoring module 234 (e.g., the monitoring module 120), a load unit management module 236 (e.g., the load unit management module 122), a presentation module 238 (e.g., the presentation module 124), and a schema update module 240. The database engine 230 may be configured to execute database commands, e.g., data manipulation language commands or database query language commands (e.g., structured query language (SQL) commands, object query commands, natural language queries, etc.), over the DBMS 202. In some examples, the database commands modify the database schema 224. For instance, the database engine 230 may be configured to create, retrieve, update, and delete database objects within the DBMS 202 in response to databases commands. Further, the database engine 230 may execute database commands included in the database requests 210(1)-(N), and the results of the execution of the database commands may be included as payload information in the database responses 212(1)-(N).

The monitoring module 234 may monitor database commands executed by the database engine 230. For example, the database request 210(1) may include a SQL query that request all users employed within a specific department of an organization. As a result, the database engine 230 may execute the SQL query and determine query results including the users employed within the department.

In addition, the monitoring module 234 may generate and manage access count information 242 which may be used to determine an access count value for each database object. For example, the monitoring module 234 may determine that the SQL query accessed a particular column of the DBMS 202, and update a count tracking the access frequency of the column by the database engine 230. In some embodiments, the monitoring module 234 may store the access count information 242 within one or more database tables of the DBMS 202.

In some embodiments, the monitoring module 234 may utilize a scan counter table provided by the DBMS 202 that tracks instances in which the database object is referenced directly within a database command. For example, the scan counter table entry pertaining to a particular database object may be updated in response to the execution of a SQL query that references the database object within a "WHERE" clause. In addition, the monitoring module 234 may utilize a materialization counter table that tracks instances in which the database object is referenced indirectly within a database command or otherwise accessed during execution of a database command. For example, the materialization counter table entry pertaining to a particular database column may be updated in response to the execution of a SQL query that causes a full table scan of the database table including the particular database column. Additionally, the monitoring module 234 may combine the information from the scan counter table and materialization table to determine the access frequency of a database object.

As illustrated in the FIG. 2, the load unit management module 236 may include threshold information 244, relative access counter (RAC) information 246, recommendation information 248, a simulation module 250, and a machine learning module 252.

In some embodiments, the load unit management module 236 may use the threshold information 244 as configuration parameters when determining the recommendation information 248. In some embodiments, the threshold information 244 may include a big memory footprint threshold (BMT), a frequent access threshold (FAT), or an in-frequent access threshold (IAT). In some embodiments, an administrator 214 may set the threshold information 244. Additionally, or alternatively, as described in detail herein, the machine learning module 252 may determine the threshold information 244.

The BMT may be used to identify database objects having a data size large enough to provide meaningful memory savings in DBMS 202. In some embodiments, the load unit management module 236 may determine the memory footprint of a memory vector (i.e., a 3-tuple including a table, partition, and column) at a sample time and apply the BMT to the memory vector. The BMT may be a percentage value between 0% and 100%. For instance, the DBMS 202 may identify the memory vectors having a memory footprint in the top 5% percentile as database objects large enough to provide meaningful memory savings.

The FAT may be used to identify database objects that are frequently being accessed in the DBMS 202, i.e., hot objects. In some embodiments, the load unit management module 236 may determine an access count of a database object vector (i.e., a 3-tuple including a table, a partition, or a column) at a sample time and apply the FAT to the database object vector. The FAT may be a percentage value between 0% and 100%.

The IAT may be used to identify database objects that are not being frequently accessed in the DBMS 202, i.e. cold objects. In some embodiments, the load unit management module 236 may determine an access count of a database object vector at a sample time and apply the IAT to the database object vector. The IAT may be a percentage value between 0% and 100%.

The RAC information 246 may include first RAC values or second RAC values. In some embodiments, the load unit management module 236 may determine a first RAC value for each database object. The first RAC value may be equal to the access counter value of the database object, as stored in the access count information 242, divided by the memory size of the database object. In some embodiments, dividing the access counter value by the memory size of the database object may provide a relative value that better represents the number of disk page accesses to the secondary storage 228.

Further, the first RAC values may be stored in sorted vectors. For example, the first RAC values for the tables of the DBMS 202 may be stored in a sorted vector VEC_SCAN_DENSITY_TABLE, the first RAC values for the partitions of the DBMS 202 may be stored in a sorted vector VEC_SCAN_DENSITY_PARTITION, and the first RAC values for the columns of the DBMS 202 may be stored in a sorted vector VEC_SCAN_DENSITY_COLUMN.

The load unit management module 236 may further determine a second RAC value for each database object. The second RAC value may be equal to the access counter value of the database object, as stored in the access count information 242, divided by the total number of records of the DBMS 202. In some embodiments, dividing the access counter value by the total number of records may provide a relative value that better represents the number of page accesses in comparison to the access counter value for the database object.

Further, the second RAC values may be stored in sorted vectors. For example, the second RAC values for the tables of the DBMS 202 may be stored in a sorted vector VSCAN_DEN_TABLE, the second RAC values for the partitions of the DBMS 202 may be stored in a sorted vector VSCAN_DEN_PAR, and the second RAC values for the columns of the DBMS 202 may be stored in a sorted vector VSCAN_DEN_COL.

Further, the load unit management module 236 may determine the recommendation information 248 based on the threshold information 244 and the RAC information 246 (e.g., the first RAC values or the second RAC values). In some embodiments, the load unit management module 236 may generate the sorted vectors using the first RAC values. Further, the load unit management module 236 may determine the hot object threshold (HOT) value and cold object threshold (COT) value based on applying the threshold information 244 to one of the sorted vectors (i.e., VEC_SCAN_DENSITY_TABLE, VEC_SCAN_DENSITY_PARTITION, VEC_SCAN_DENSITY_COLUMN).

As shown in equation below 1, to determine the HOT value, the load unit management module 236 may multiply the FAT by the number of values in the sorted vector to determine an intermediate result, and round up the intermediate value to determine the index of the HOT value within the sorted vector.

$$\text{HOT value} = \text{VEC\_SCAN\_DENSITY}[\text{ROUND}(\text{FAT}*\text{VEC\_SCAN\_DENSITY.size}(\,))] \quad (1)$$

As shown in equation below 2, to determine the COT value, the load unit management module 236 may multiply the IAT by the number of values in the sorted vector to determine an intermediate result, and round up the intermediate result to determine the index of the COT value within the sorted vector.

$$\text{COT value} = \text{VEC\_SCAN\_DENSITY}[\text{ROUND}(\text{IAT}*\text{VEC\_SCAN\_DENSITY.size}(\,))] \quad (2)$$

Further, the load unit management module 236 may apply the HOT value and the COT value to each of the stored vectors to determine initial recommendation information. In response to determining that a database object has a first RAC value greater than the HOT value, the load unit management module 236 may be recommend loading the contents of the database object into memory 226 from the secondary storage 228 when accessing the database object. In other words, the load unit management module 236 determines that the recommended load unit for the database object is column loadable. In response to determining that a database object has a first RAC value lesser than the COT value, the load unit management module 236 may recommend loading only a portion of the database object into the memory 226 from the secondary storage 228 when accessing the database object. In other words, the load unit management module 236 determines that the recommended load unit for the database object is page loadable.

In some embodiments, the initial recommendation information may include recommendation conflicts due to multiple conflicting recommendations applying to a database object. For instance, suppose the table T includes the column C, and the initial recommendation information recommends that the table T and all of its database objects (e.g., column C) be column loadable while also recommending that column C is page loadable even though it is included in the table T. In response, the load unit management module 236 may apply a conflict resolution strategy to determine the recommendation information 248 from the initial recommendation information.

In some embodiments, the conflict resolution strategy may select the recommendation corresponding to the smallest unit within the database object hierarchy. For example, the load unit management module 236 may select the recommendation determined for the column over the recommendation determined for the partition or table containing the column. As another example, the load unit management module 236 may select the recommendation determined for a partition over the recommendation determined for the table containing the partition.

In some other embodiments, the load unit management module 36 may generate the sorted vectors using the second RAC values. Further, the load unit management module 236 may determine the HOT values and COT values for each of the sorted vectors VSCAN_DEN_TABLE, VSCAN_DEN_PART, VSCAN_DEN_COL).

As shown in equation below 3, to determine the HOT value for the database tables, the load unit management module 236 may multiply the FAT by the number of values in the VSCAN_DEN_TABLE to determine an intermediate result, and round up the intermediate value to determine the index of the HOT value, for the database tables, within the sorted vector VSCAN_DEN_TABLE.

$$\text{HOT value for Table} = \text{VSCAN\_DEN\_TABLE}[\text{ROUND}(\text{FAT}*\text{VSCAN\_DEN\_TABLE.size}(\,))] \quad (3)$$

As shown in equation below 4, to determine the COT value for the database tables, the load unit management module 236 may multiply the IAT by the number of values in the VSCAN_DEN_TABLE to determine an intermediate result, and round up the intermediate result to determine the index of the COT value, for the database tables, within the stored vector VSCAN_DEN_TABLE.

$$\text{COT value for Tables} = \text{VSCAN\_DEN\_TABLE}[\text{ROUND}(\text{IAT}*\text{VSCAN\_DEN\_TABLE.size}(\,))] \quad (4)$$

As shown in equation below 5, to determine the HOT value for the database partitions, the load unit management module 236 may multiply the FAT by the number of values in the VSCAN_DEN_PART to determine an intermediate result, and round up the intermediate value determine the index of the HOT value, for the database partitions, within the sorted vector VSCAN_DEN_PART.

$$\text{HOT value for Partitions} = \text{VSCAN\_DEN\_PART}[\text{ROUND}(\text{FAT}*\text{VSCAN\_DEN\_PART.size}(\,))] \quad (5)$$

As shown in equation below 6, to determine the COT value for the database partitions, the load unit management module 236 may multiply the IAT by the number of values in the VSCAN_DEN_PART to determine an intermediate result, and round up the intermediate result to determine the index of the COT value, for the database partitions, within the stored vector VSCAN_DEN_PART.

$$\text{COT value for Partitions} = \text{VSCAN\_DEN\_PART}[\text{ROUND}(\text{IAT}*\text{VSCAN\_DEN\_PART.size}(\,))] \quad (6)$$

As shown in equation below 7, to determine the HOT value for the database columns, the load unit management module 236 may multiply the FAT by the number of values in the VSCAN_DEN_COL to determine an intermediate result, and round up the intermediate value to determine the index of the HOT value, for the database columns, within the sorted vector VSCAN_DEN_COL.

$$\text{HOT value for Columns} = \text{VSCAN\_DEN\_COL}[\text{ROUND}(\text{FAT}*\text{VSCAN\_DEN\_COL.size}(\,))] \quad (7)$$

As shown in equation below 8, to determine the COT value for the database columns, the load unit management module 236 may multiply the TAT by the number of values in the VSCAN_DEN_COL to determine an intermediate result, and round up the intermediate result to determine the index of the COT value, for the database columns, within the stored vector VSCAN_DEN_COL.

$$\text{COT value for Columns} = \text{VSCAN\_DEN\_COL}[\text{ROUND}(\text{IAT}*\text{VSCAN\_DEN\_COL.size}(\,))] \quad (8)$$

Further, the load unit management module 236 may apply each of the HOT values and COT values to the corresponding stored vector to determine initial recommendation information. For instance, in response to determining that a database table has a second RAC value greater than the HOT value for the database tables, the load unit management module 236 may recommend loading the contents of the database table into the memory 226 when accessing the database table. In other words, the load unit management module 236 determines that the recommended load unit for the database object is column loadable. Further, in response to determining that a database column has a second RAC value lower than the COT value for the database columns, the load unit management module 236 may recommend loading only a portion of the database column into the memory 226 when accessing the database column. In other words, the load unit management module 236 determines that the recommended load unit for the database object is page loadable. Additionally, or alternatively, the load unit management module 236 may average the HOT values to determine an average HOT value, and use the average HOT value to identify the column loadable data objects. Similarly, the load unit management module 236 may average the COT values to determine an average COT value, and use the average COT value to identify the page loadable data objects.

As described in detail above, the initial recommendation information may include recommendation conflicts due to conflicting recommendations applying to a database object. As such, the load unit management module 236 may apply a conflict resolution strategy to determine the recommendation information 248 from the initial recommendation information determined using the HOT and COT values for database tables, the HOT and COT values for database partitions, and the HOT and COT values for database columns.

In some embodiments, the load unit management module 236 may apply the BMT to the initial recommendation information to prune recommended load units that would not lead to significant memory savings. In some embodiments, the BMT may be applied to the initial recommendation information before or after application of a conflict resolution strategy.

Once the load unit management module 236 determines the recommendation information 248, the load unit management module 236 may provide the recommendation information 248 to the presentation module 238 or the schema update module 240. The presentation module 238 may format the recommendation information 248, and send the recommendation information 248 to the administrator devices 204(1)-(N). For example, the administrator device 204(1) may send a database request 210(1) requesting the recommendation information 248, and the presentation module 238 may format the recommendation information 248 and send a database response 212(1) including the formatted recommendation information 248.

Once the administrator device 204(1) receives the database response 212(1) including the formatted recommendation information 248, the administrator 214(1) may decide to implement the recommendation information 248. For example, the administrator 214(1) may employ the administrator device 204(1) to send a database request 210(2) instructing the database engine 230 to modify the database schema 224 in accordance with the recommendation information 248. In response to the database request 210(2), the database engine 230 may update the database schema 224 so that the database objects classified as hot objects are loaded into memory 226 as the fully loaded column loadable database objects 218, and the objects classified as cold objects are loaded into the memory 226 as the partially loaded page loadable database objects 222. As described in detail herein, the partially loaded page loadable database object 222 may not include all of the contents of its corresponding page loadable database object 220. As an example, the partially loaded page loadable database object 222(1) may not include all of the contents of the page loadable database object 220(1).

Additionally, the schema update module 240 may automatically modify the database schema 224 based on the recommendation information 248. For example, once the load unit management module 236 generates the recommendation information 248, the schema update module 240 may cause the database engine 230 to modify the database schema 224 in accordance with the recommendation information 248. For example, the schema update module 240 may instruct the database engine 230 to modify the database schema 224 so that the database objects classified as hot objects are loaded into memory 226 as the fully loaded column loadable database objects 218 when accessed by the DBMS 202, and the objects classified as cold objects are only partially loaded as the partially loaded page loadable database objects 222 when accessed by the DBMS 202.

The simulation module 250 may capture a workload executed by the database engine 230. In addition, the simulation module 250 may generate a provisional database schema based on applying the recommendation information 248 to the database schema 224. Further, the simulation module 250 may replay the workload in a shadow system using the provisional database schema, and determine if the recommendation information 248 results in a reduced memory footprint within the shadow system without negatively impacting performance of the shadow system. If the provisional database schema results in a reduced memory footprint without negatively impacting system performance, the schema update module 240 may update the database schema 224 to the provisional database schema. As referred to herein, in some embodiments, a "shadow system" may be a DBMS testing system having similar attributes to the DBMS 202. In some embodiments, the shadow system may have a similar configuration or schema to the DBMS 202.

The machine learning module 252 may employ machine learning techniques and/or pattern recognition techniques to determine the threshold information 244 (e.g., BMT, FAT, IAT). Further, the machine learning module 252 may include hidden Markov models, decision trees, regression models, support vector machines, or artificial neural networks for determining the threshold information 244. In some embodiments, the machine learning module 252 may determine the threshold information 244 based on historical usage information, planned usage information, memory attributes, secondary storage attributes, database object attributes, historic database object access history, historical database object access patterns, historic workload information, etc.

Figure 3:
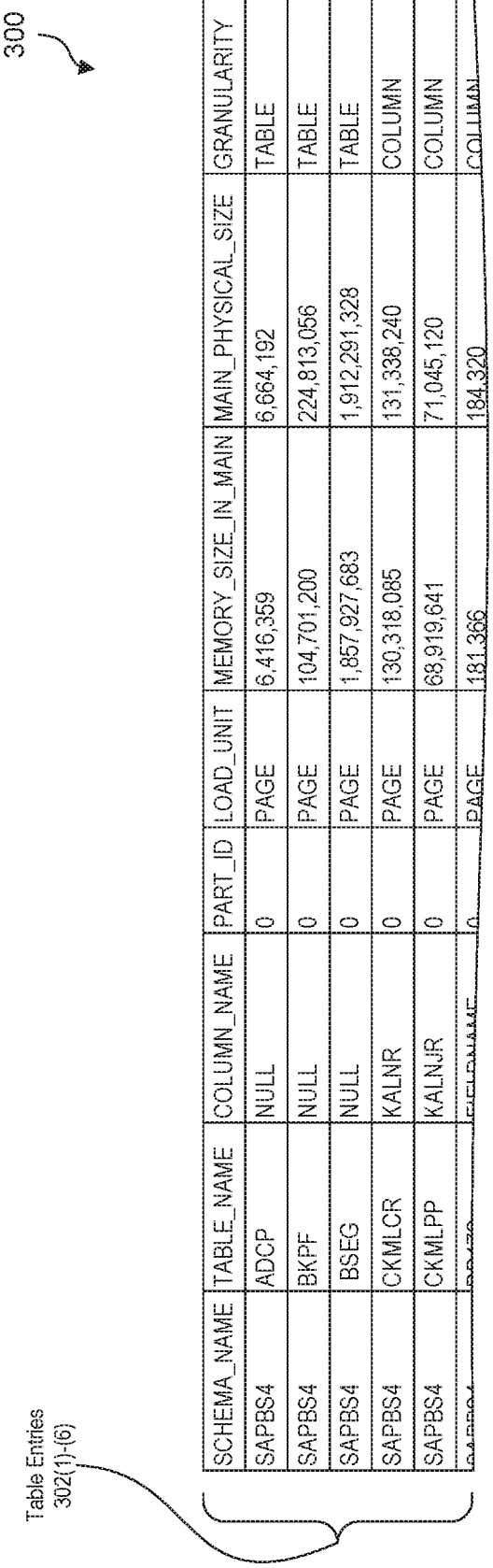
FIG. 3 illustrates example load unit recommendation information, according to some embodiments.
Figure 4:
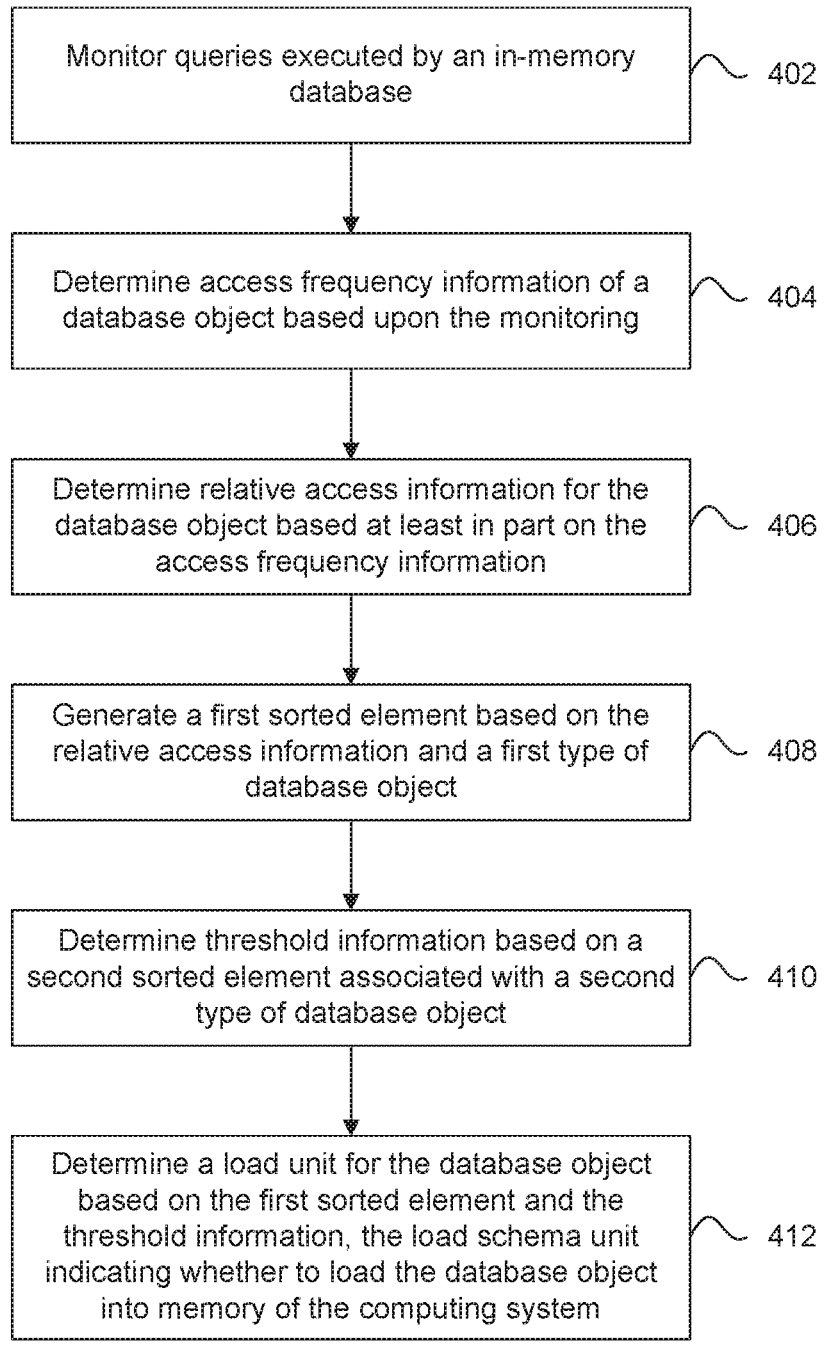
FIG. 4 is a flowchart illustrating a method for determining load unit recommendation information, according to some embodiments.

FIG. 3 illustrates example recommendation information, according to some embodiments. As illustrated in FIG. 3, recommendation information may be represented as a data table 300 including a plurality of table entries 302(1)-(N). As further illustrated in FIG. 3, the data table 300 may include the following columns: schema identifier, table name, column name, partition identifier, recommended load unit, memory size in main memory, memory size of the database object, and granularity. Further, the schema identifier may identify a schema including the database object, the table name may identify the table associated with the database object, column name may identify the column of the database object, partition identifier may identify the partition associated with the database object, and the recommended load unit identifier may indicate whether the database object should be column loadable or page loadable. Further, the memory size in main memory may represent the memory footprint of the database object within memory, the memory size of the database object may represent the total memory size of the database object, and the granularity may identify the type of the database object.

As an example, the table entry 302(1) may correspond to recommendation information indicating that the table ADCP and the contents of the table ADCP should be processed as page loadable database objects. Further, the table entry 302(4) may correspond to recommendation information indicating that the column KAT NR, of the table CKMLCR, should be loaded into memory as a column loadable database object.

Method 400 shah be described with reference to FIGS. 1, 2, and 3. However, method 400 is not limited to those example embodiments.

In 402, the DBMS may monitor queries executed by an in-memory database. For instance, the monitoring module 234 may monitor database commands executed by the database engine 230. In some embodiments, the database commands may be included in database requests received from the administrator devices 204(1)-(N) or the client devices 206(1)-(N). Further, the database commands may cause the database engine 230 to access one or more database objects of the DBMS 202. For example, the database command may include a query over a database column USERNAME.

In 404, the DBMS may determine an access frequency of a database object based upon the monitoring. For instance, the monitoring module 234 may generate access count information 242 indicating a frequency of access of the database object. As an example, the monitoring module may generate and maintain access count information 242 indicating the amount of times the column USERNAME has been accessed. In some embodiments, the access count information 242 may be maintained across two separate database tables. Further, the DBMS 202 may determine the access count of a database object by combining the count information stored in both databases.

In 406, the DBMS may determine relative access counter information for the database object based at least in part on the access frequency. For instance, the load unit management module 236 may determine the RAC information 246 including a first RAC value or a second RAC value for the column USERNAME. As described in detail herein, the first RAC value of the column USERNAME may be equal to the access counter value of the column, as stored in the access count information 242, divided by the memory size of the column. Further, the second RAC value of the column may be equal to the access counter value of the column, as stored in the access count information 242, divided by the total number of records of the DBMS 202.

In 408, the DBMS may generate a first sorted element based on the relative access counter information and a first type of database object. For instance, the load unit management module 236 may insert the first RAC value of the column USERNAME into a sorted vector including the first RAC values of the other columns of the DBMS 202. Additionally, or alternatively, the second RAC value of the column USERNAME is inserted into a sorted vector along with the second RAC values of the other columns of the DBMS 202.

In 410, the DBMS may determine threshold values based on threshold information and a second sorted element associated with a second type of database object. For instance, in some embodiments, the load unit management module 236 may determine a HOT value and a COT value based on the threshold information 244 and one of the sorted vectors (i.e., VEC_SCAN_DENSITY_TABLE, VEC_SCAN_DENSITY_PARTITION, VEC_SCAN_DENSITY_COLUMN) storing first RAC values.

In some other instances, the load unit management module 236 may determine the HOT value for columns of the database and a COT value for columns of the database based on the threshold information 244 and the sorted vector (i.e., VSCAN_DEN_COL) storing second RAC values for the columns of the DBMS 202.

In 412, the DBMS may determine a load unit for the database object based on the first sorted element and the threshold values. For instance, the load unit management module 236 may determine that the column USERNAME should be loaded into the memory 226 as the fully loaded column loadable database object 218(1) based upon the first RAC value associated with the column being greater than the HOT value associated with the first RAC values. In some other instances, the load unit management module 236 may determine that the column USERNAME should be partially loaded into the memory 226 as the partially loaded page loadable database object 222(1) based upon the first RAC value associated with the column being lesser than the COT value associated with the first RAC values.

Additionally, or alternatively, in some instances, the load unit management module 236 may determine that the column USERNAME should be loaded into the memory 226 as the fully loaded column loadable database object 218(1) based upon the second RAC value being greater than the HOT value for columns of the DBMS 202. In some other instances, the load unit management module 236 may determine that the column USERNAME should be partially loaded into the memory 226 as the partially loaded page loadable database object 222(1) based upon the second RAC value associated with the column USERNAME being lesser than the COT value for columns of the DBMS 202.

In some embodiments, multiple recommendations may apply to the column USERNAME. For instance, a first recommendation may apply to the column USERNAME, and a second recommendation may apply to a table including the column USERNAME. In response, the load unit management module 236 may apply a conflict resolution strategy. In some examples, the conflict resolution strategy may select the recommendation determined with respect to the hierarchically lower database object, i.e., selecting the recommendation determined with respect to the column over the recommendation determined with respect to the table including the column. In other words, the conflict resolution strategy may select between conflicting recommended load units based upon the granularities of the recommended load units.

Further, in some embodiments, the DBMS 202 may present the recommendation information 248 (i.e., the recommended load units) to a user via the presentation module 238, or automatically update the database schema 224 via the schema update module 240.

Figure 5:
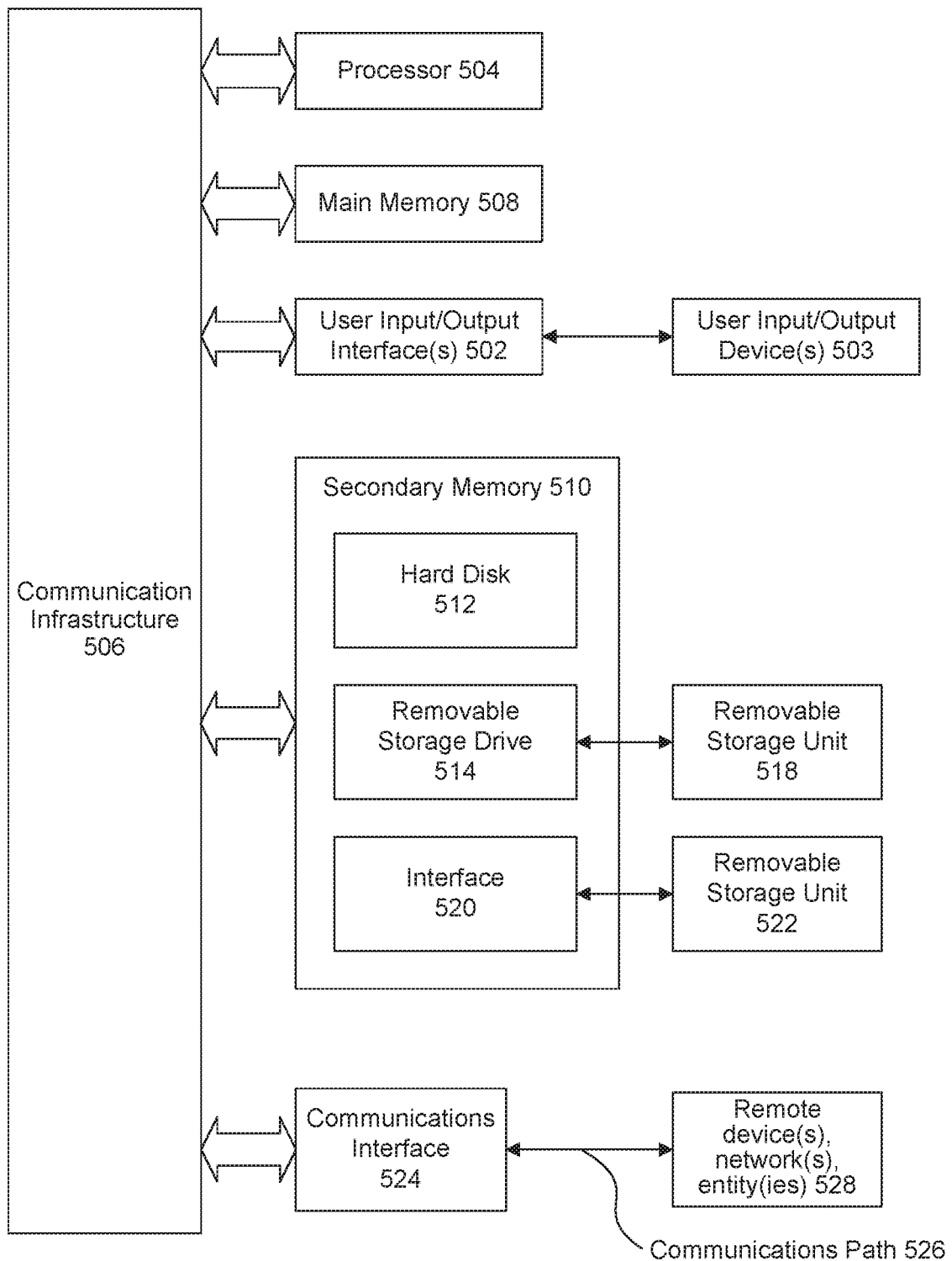
FIG. 5 is an example computer system useful for implementing various embodiments.

Various embodiments may be implemented, for example, using one or more well-known computer systems, such as computer system 500 shown in FIG. 5. One or more computer systems 500 may be used, for example, to implement any of the embodiments discussed herein, as well as combinations and sub-combinations thereof.

Computer system 500 may include one or more processors (also called central processing units, or CPUs), such as a processor 504. Processor 504 may be connected to a communication infrastructure or bus 506.

Computer system 500 may also include user input/output device(s) 503, such as monitors, keyboards, pointing devices, etc., which may communicate with communication infrastructure 506 through user input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 508, such as random access memory (RAM). Main memory 508 may include one or more levels of cache. Main memory 508 may have stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 may include a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method comprising:
   monitoring queries executed by a database management system (DBMS) including a column loadable database object that is identified to be fully loaded into a memory of the DBMS during access by the DBMS, and a page loadable database object that is identified to be partially loaded into the memory of the DBMS during access by the DBMS;
   determining a first access frequency of the column loadable database object based upon the monitoring;
   determining a second access frequency of the page loadable database object based upon the monitoring;
   determining first relative access counter information for the column loadable database object based at least in part on the first access frequency;
   determining second relative access counter information for the page loadable database object based at least in part on the second access frequency;
   generating a first sorted element based on the first relative access counter information;
   generating a second sorted element based on the second relative access counter information;
   determining first threshold values based on threshold information and the first sorted element;
   determining second threshold values based on the threshold information and the second sorted element;
   determining, based on the first sorted element and the first threshold values, a page loadable load unit for the column loadable database object indicating that the column loadable database object is to be partially loaded into the memory of the DBMS during access by the DBMS as a partially loaded page loadable database object; and
   determining, based on the second sorted element and the second threshold values, a column loadable load unit for the page loadable database object indicating that the page loadable database object is to be fully loaded into the memory of the DBMS during access by the DBMS as a fully loaded column loadable database object.

2. The method of claim 1, further comprising updating a database schema associated with the DBMS based on the page loadable load unit and the column loadable load unit.

3. The method of claim 1, wherein determining the first threshold values comprises:
   determining a hot object threshold (HOT) value based on a frequent access threshold (FAT) and the first sorted element; and
   determining a cold object threshold (COT) value based on an in-frequent access threshold (TAT) and the first sorted element.

4. The method of claim 3, wherein determining the page loadable load unit for the column loadable database object comprises comparing the first relative access counter information to at least one of the COT value or the HOT value.

5. The method of claim 1, wherein determining the page loadable load unit comprises:
   identifying a first recommendation result associated with the column loadable database object, the first recommendation result having a first granularity;
   identifying a second recommendation result associated with the column loadable database object, the second recommendation result having a second granularity; and
   selecting the first recommendation result or the second recommendation result based at least in part on comparing the first granularity to the second granularity.

6. The method of claim 1, wherein determining the page loadable load unit comprises:
   determining a workload previously executed within the DBMS;
   replaying the workload in a shadow system implementing the page loadable load unit; and
   evaluating performance of the shadow system during the replaying of the workload.

7. The method of claim 1, wherein the column loadable database object includes at least one of a database table, a database partition, or a database column.

8. A non-transitory computer-readable device having instructions stored thereon that, when executed by at least one computing device, cause the at least one computing device to perform operations comprising:
   monitoring queries executed by an in-memory database including a column loadable database object that is identified to be fully loaded into a memory of the in-memory database during access by the in-memory database, and a page loadable database object that is identified to be partially loaded into the memory of the in-memory database during access by the in-memory database;
   determining a first access frequency of the column loadable database object based upon the monitoring;
   determining a second access frequency of the page loadable database object based upon the monitoring;
   determining first relative access counter information for the column loadable database object based at least in part on the first access frequency;
   determining second relative access counter information for the page loadable database object based at least in part on the second access frequency;
   generating a first sorted element based on the first relative access counter information;
   generating a second sorted element based on the second relative access counter information;

determining first threshold values based on threshold information and the first sorted element;

determining second threshold values based on the threshold information and the second sorted element;

determining, based on the first sorted element and the first threshold values, a page loadable load unit for the column loadable database object indicating that the column loadable database object is to be partially loaded into the memory of the DBMS during access by the DBMS as a partially loaded page loadable database object; and determining, based on the second sorted element and the second threshold values, a column loadable load unit for the page loadable database object indicating that the page loadable database object is to be fully loaded into the memory of the DBMS during access by the DBMS as a fully loaded column loadable database object.

9. The non-transitory computer-readable device of claim 8, wherein determining the page loadable load unit comprises:

identifying a first recommendation result associated with the column loadable database object, the first recommendation result having a first granularity;

identifying a second recommendation result associated with the column loadable database object, the second recommendation result having a second granularity; and selecting the first recommendation result or the second recommendation result based at least in part on comparing the first granularity to the second granularity.

10. The non-transitory computer-readable device of claim 8, wherein determining the page loadable load unit comprises:

determining a workload previously executed within the in-memory database;

replaying the workload in a shadow system implementing the page loadable load unit; and evaluating performance of the shadow system during the replaying of the workload.

11. The non-transitory computer-readable device of claim 8, wherein the threshold information includes at least one of a frequent access threshold or an in-frequent access threshold.

12. The non-transitory computer-readable device of claim 8, the operations further comprising updating a database schema based upon the page loadable load unit and the column loadable load unit.

13. The non-transitory computer-readable device of claim 8, wherein the column loadable database object includes at least one of a database table, a database partition, or a database column.

14. A database management system (DBMS) comprising:
a memory;
a secondary storage comprising a column loadable database object that is identified to be fully loaded into the memory during access by the DBMS, and a page loadable database object that is identified to be partially loaded into the memory during access by the DBMS; and
one or more processors and/or circuits coupled to the memory and the secondary storage, and configured to:
monitor queries executed by the DBMS;
determine a first access frequency of the column loadable database object based upon the monitored queries;
determine a second access frequency of the page loadable database object based upon the monitored queries;
determine first relative access counter information for the column loadable database object based at least in part on the first access frequency;
determine second relative access counter information for the page loadable database object based at least in part on the second access frequency;
generate a first sorted element based on the first relative access counter information;
generate a second sorted element based on the second relative access counter information;
determine first threshold values based on threshold information and the first sorted element;
determine second threshold values based on the threshold information and the second sorted element;
determine, based on the first sorted element and the first threshold values, a page loadable load unit for the column loadable database object indicating that the column loadable database object is to be partially loaded into the memory of the DBMS during access by the DBMS as a partially loaded page loadable database object; and
determine, based on the second sorted element and the second threshold values, a column loadable load unit for the page loadable database object indicating that the page loadable database object is to be fully loaded into the memory of the DBMS during access by the DBMS as a fully loaded column loadable database object.

15. The DBMS of claim 14, wherein the one or more processors and/or circuits are further configured to update a database schema associated with the DBMS based on the page loadable load unit and the column loadable load unit.

16. The DBMS of claim 14, wherein to determine the page loadable load unit, the one or more processors and/or circuits are further configured to:

identify a first recommendation result associated with the column loadable database object, the first recommendation result having a first granularity;

identify a second recommendation result associated with the column loadable database object, the second recommendation result having a second granularity; and select the first recommendation result or the second recommendation result based at least in part on comparing the first granularity to the second granularity.

17. The DBMS of claim 14, wherein to determine the page loadable load unit, the one or more processors and/or circuits are further configured to:

determine a workload previously executed within the DBMS;

replay the workload in a shadow system implementing the page loadable load unit; and evaluate performance of the shadow system during the replaying of the workload.

18. The DBMS of claim 14, wherein the column loadable database object includes at least one of a database table, a database partition, or a database column.

* * * * *